(12) United States Patent
Janitch

(10) Patent No.: US 9,279,705 B2
(45) Date of Patent: Mar. 8, 2016

(54) HIGH TEMPERATURE HIGH PRESSURE SEAL

(71) Applicant: Magnetrol International, Incorporated, Downers Grove, IL (US)

(72) Inventor: Paul G. Janitch, Lisle, IL (US)

(73) Assignee: Magnetrol International, Incorporated, Downers Grove, IL (US)

( * ) Notice: Subject to any disclaimer, the term of this patent is extended or adjusted under 35 U.S.C. 154(b) by 557 days.

(21) Appl. No.: 13/657,114

(22) Filed: Oct. 22, 2012

(65) Prior Publication Data

US 2014/0109699 A1     Apr. 24, 2014

(51) Int. Cl.
*G01D 11/30*     (2006.01)

(52) U.S. Cl.
CPC ..................................... *G01D 11/30* (2013.01)

(58) Field of Classification Search
None
See application file for complete search history.

(56) References Cited

U.S. PATENT DOCUMENTS

| 6,247,362 | B1* | 6/2001 | Soroka | 73/290 V |
| 7,467,548 | B2 | 12/2008 | Fredriksson | |
| 2006/0225499 | A1* | 10/2006 | Gravel et al. | 73/290 V |

* cited by examiner

*Primary Examiner* — Robert R Raevis
(74) *Attorney, Agent, or Firm* — Wood, Phillips, Katz & Clark & Mortimer

(57) ABSTRACT

A probe for use with a measurement instrument includes a circuit connected to the probe. The probe comprises a process adaptor for mounting to a process vessel and including a through bore extending from a connector end to a process end. A tubular body is received in the process adaptor at the connector end and has an outer diameter less than an inner diameter of the process adaptor at the connector end to define a cavity therebetween. The cavity is open to the process vessel. A coupling secures the body to the process adaptor. A center conductor is coaxial with the tubular body and the process adaptor. A seal element is disposed between the tubular body and the center conductor. Process pressure in the process vessel increases compressive force between the tubular body and the seal element.

19 Claims, 4 Drawing Sheets

HIGH TEMPERATURE HIGH PRESSURE SEAL

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a guided wave radar probe with leak detection.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and low cost time domain reflectometry (TDR) instruments.

In a TDR instrument, a very fast pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

In one form, a guided wave radar (GWR) transmitter uses a coaxial probe that functions as an electrical transmission line into the process vessel. The GWR measurement process begins with an electrical pulse that is launched along the probe from one end. A TDR circuit identifies impedance discontinuities along the length of the probe. One source of an impedance discontinuity occurs at the vapor to liquid interface due to the difference in the relative dielectrics of the media. The TDR circuit detects, and locates in time, the reflected signal from the interface. Another source of an impedance discontinuity can be a change in geometry in the transmission line. This is a convenient method for producing a known reference location, called a fiducial (FID) in the probe. The difference in the TDR time measurements of the fiducial to the vapor to liquid interface is used to calculate the liquid level. Another impedance discontinuity exists at the end of the probe (FOP). With this type of probe and TDR circuit an increased impedance creates a positive reflected signal.

Process instruments are sometimes used for sensing level of a pressurized vessel. Often, the contents of the vessel are at a high temperature. In order to seal the vessel at the probe connection, an appropriate seal must be included. The seal must be appropriate for the relatively high temperatures and pressures when used in such applications.

One known seal with a coaxial probe has a pin conductor coaxially received in a metal body. An annular seal is hermetically sealed to the pin conductor and the metal body. The seal may be of glass, ceramic or glass-ceramic. With such a design, internal pressure from the process vessel causes tensile hoop stresses on the metal body. This lowers the compression force between the seal and the metal body. This can result in catastrophic failure of the seal which would result in loss of seal for the process vessel.

The present invention is directed to solving one or more of the problems discussed above in a novel and simple manner.

SUMMARY

As described herein, a process instrument includes a high temperature, high pressure probe seal.

There is disclosed in accordance with one aspect of the invention a probe for use with a measurement instrument including a circuit connected to the probe. The probe comprises a process adaptor for mounting to a process vessel and including a through bore extending from a connector end to a process end. A tubular body is received in the process adaptor at the connector end and has an outer diameter less than an inner diameter of the process adaptor at the connector end to define a cavity therebetween. The cavity is open to the process vessel. A coupling secures the body to the process adaptor. A center conductor is coaxial with the tubular body and the process adaptor. A seal element is disposed between the tubular body and the center conductor. Process pressure in the process vessel increases compressive force between the tubular body and the seal element.

It is a feature that the probe has an electrical connector at the connector end of the process adaptor.

It is another feature that the tubular body comprises a metal body.

It is a further feature that the metal body comprises a flange welded to the coupling.

It is still another feature that the seal element comprises a glass seal.

It is an additional feature that the tubular body includes a first counterbore at a process end defining a first shoulder supporting the glass or ceramic seal. The tubular body may comprise a second counterbore at a connector end receiving a dielectric insert housed in the coupling.

There is disclosed in accordance with another aspect of the invention a probe defining a transmission line for use with a measurement instrument including a pulse circuit connected to the probe for generating pulses on the transmission line and receiving reflected pulses on the transmission line. The probe comprises a process adaptor for mounting to a process vessel and including a through bore extending from a connector end to a process end. A tubular metal body is received in the process adaptor at the connector end and has an outer diameter less than an inner diameter of the process adaptor at the connector end to define a cavity therebetween. The cavity is open to the process vessel. The tubular metal body has an enlarged counterbore facing the process vessel to define a shoulder. A coupling secures the tubular metal body to the process adaptor. A center conductor is coaxial with the tubular metal body and the process adaptor. A glass or ceramic seal element between the tubular metal body and the center conductor engages the shoulder. Process pressure in the process vessel increases compressive force between the tubular body and the seal element.

There is disclosed in accordance with a further aspect of the invention a probe for use with a measurement instrument including a circuit connected to the probe. The probe comprises a process adaptor for mounting to a process vessel and including a through bore extending from a connector end to a process end. A tubular metal body is received in the process adaptor at the connector end and has an outer diameter less than the inner diameter of the process adaptor at the connector end to define a cavity therebetween. The cavity is open to the process vessel. A coupling secures the body to the process adaptor. A center conductor is coaxial with the tubular body and the process adaptor. A glass or ceramic seal between the tubular body and the center conductor provides a hermetic seal. The process pressure in the process vessel increases compressive force between the tubular body and the seal element.

Other features and advantages will be apparent from a review of the entire specification, including the appended claims and drawings.

DETAILED DESCRIPTION

Figure 1:
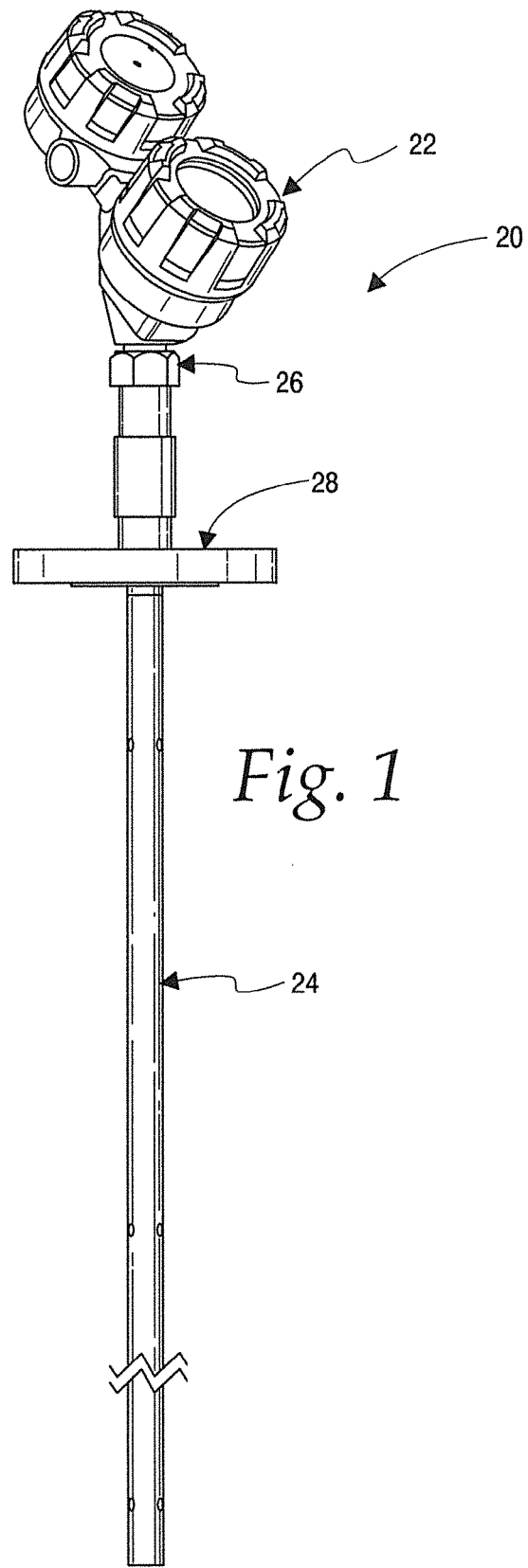
FIG. 1 is an elevation view of a guided wave radar instrument including a probe with a high temperature, high pressure seal.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel (not shown) using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel.

As described more particularly below, the controller 30 generates and transmits pulses on the probe 24. A reflected signal is developed off any impedance changes, such as the liquid surface of the material being measured. A small amount of energy may continue down the probe 24.

Guided wave radar combines TDR, ETS and low power circuitry. TDR uses pulses of electromagnetic (EM) energy to measure distanced or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second.

Figure 2:
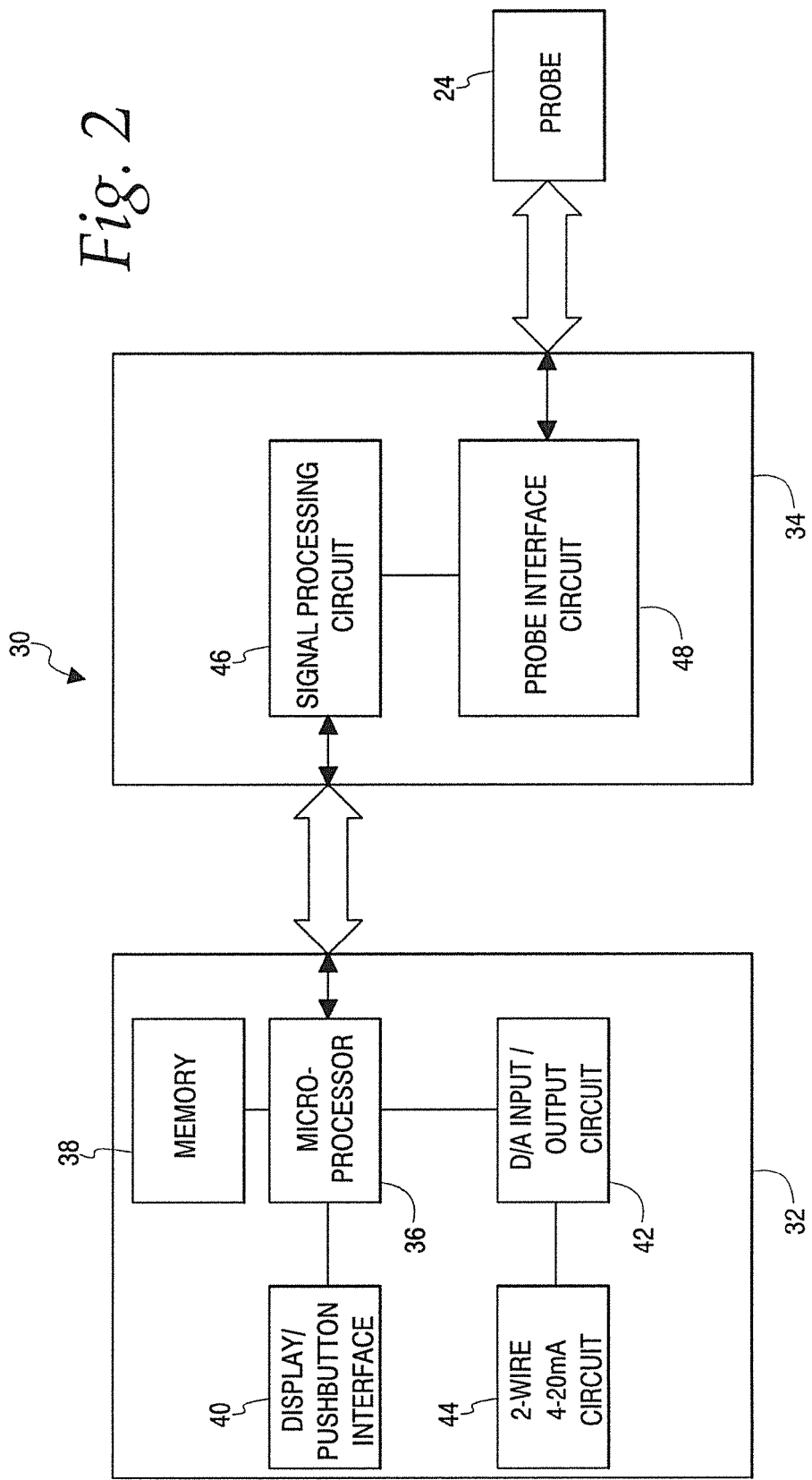
FIG. 2 is a block diagram of the transmitter of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 3:
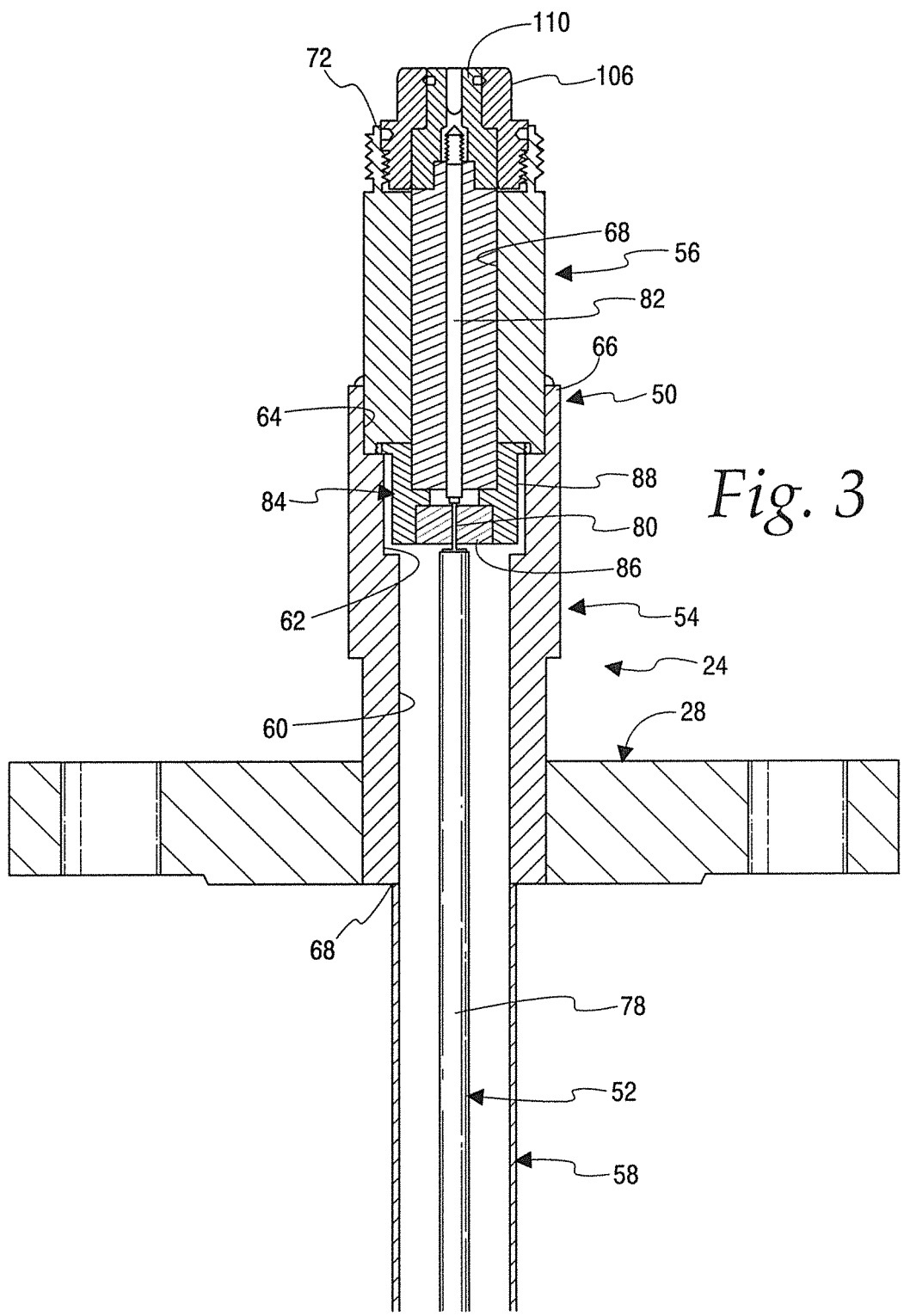
FIG. 3 is a partial sectional view of the probe of FIG. 1.
Figure 4:
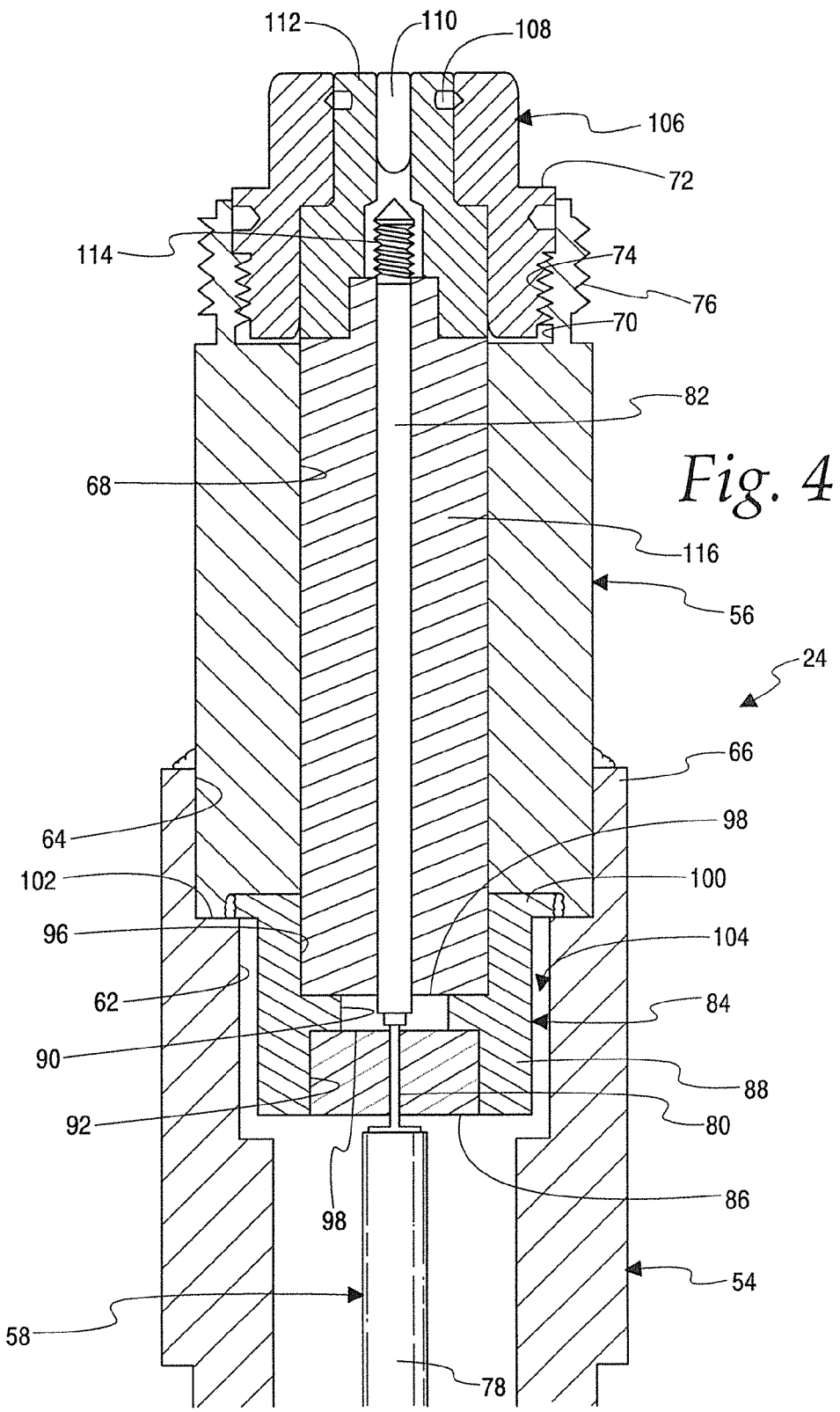
FIG. 4 is a detailed view of the probe seal.

Referring to FIGS. 3 and 4, the probe 24 includes a conductive outer sleeve 50 and a center conductor 52 coaxial with the outer sleeve 50 for conducting the pulses.

While the illustrated probe is described in connection with a GWR measurement instrument, the seal design used therewith can be used with any form of tank measurement instrument, including temperature, pressure, density, flow and level measurement, that requires a signal or power transmission into a sealed process vessel. Exemplary technologies include, GWR, through air radar, capacitance and thermistor.

The conductive outer sleeve 50 is of multi-part construction and includes a process adaptor 54, an extension sleeve 56 and a process tube 58. The process adaptor 54 is generally cylindrical and includes a cylindrical through bore 60. The through bore 60 includes a first counterbore 62, of a first diameter greater than a diameter of the through bore 60, and a second counterbore 64, of a second diameter greater diameter than the first diameter, at a connector end 66. The process tube 58 is welded to the process adaptor 54 at a process end 68 and is of a length dependent on the height of the process vessel. With a single rod probe the process tube 58 will be omitted.

The extension sleeve 56 is of a diameter corresponding to the process adaptor second counterbore 64 and is received therein and secured either by threading or welding, as necessary. The extension sleeve 56 includes a through bore 68 and a counterbore 70 at a near end 72. The near end 72 includes an inner thread 74 and an outer thread 76. The outer thread 76 is received in the connector 26, see FIG. 1.

The center conductor 52 comprises a probe rod 78, a conductor pin 80 and a connector rod 82. The center conductor 52 is for extending into the process vessel. The conductor pin 80 connects the probe rod 78 to the connector rod 82. A seal assembly 84 in accordance with the invention provides a high temperature, high pressure seal of the process vessel. The seal assembly 84 comprises an annular seal element 86 received in a tubular metal body 88. The metal body 88 includes a through bore 90 with a first counterbore 92 at a process end defining a first shoulder 94 and a second counterbore 96 at an opposite end defining a second shoulder 98. A flange 100 extends outwardly from the metal body 88 at the connector end which is welded to the extension sleeve 56.

In accordance with the invention, the metal body 88 has an outer diameter less than an inner diameter of the process adaptor first counterbore 62 to define a cavity 104 therebetween. The cavity 104 is open to the process vessel, as is apparent.

The seal assembly 84 is formed by positioning the pin conductor 80 coaxially in the metal body 88 using an appropriate fixture (not shown). The seal material 86 in the form of a molten glass, ceramic, or a glass ceramic mixture, or the like is poured into the first counterbore 92 to form an annular body resting on the first shoulder 94. Upon hardening, the seal element 86 provides a hard seal which is bonded to the metal of the tubular metal body 88 and the pin conductor 80 and provides a hermetic seal.

A connector nut 106 is threadably received in the extension sleeve inner thread 74. An electrical terminal 110 passes through an insert 112 in the nut 106 for connecting to the connector rod 82. An o-ring 108 is disposed between the nut 106 and the insert 112. The o-ring 108 functions as a secondary seal. The electrical terminal 110 threadably receives the connector rod at 114 to define a fiducial element. The seal element 84 is spaced a select distance from the connector 106. A dielectric insert 116 is disposed therebetween.

The connecting nut 106 and extension sleeve 56 together define a coupling to secure the seal element 84 to the process adaptor 54 and to provide an electrical connection to the controller 30. As is apparent, the coupling could utilize any structure adapted for providing an electrical connection to the probe rod 78 via the conductor pin 80 such as a connector nut or the like according to the particular configuration of the probe. In use, a 50 ohm coax cable (not shown) is electrically connected to the terminal 110 for connection to the controller 30.

In accordance with the invention, any process pressure in the pressure vessel is present in the process adaptor 54 and thus enters the cavity 104. This increases compressive force between the tubular metal body 88 and the glass seal element 86. Thus, the pressure on the seal element 86 is balanced. The process pressure is adding to the compression between the seal element 86 and the metal body 88 which increases sealing capacity. The seal element 86 is also reinforced with a step body formed by the metal body first shoulder 94 which prevents the seal element 86 from catastrophic failure.

It has been found that a conventional hermetic glass/ceramic seal, as discussed above, used with prior process instruments is capable of withstanding process conditions up to about 2200 psi. The use of the seal balance described herein approximately triples this holding power to about 6000 psi. Moreover, the reinforcement provided by the shoulder at the upper edge of the glass seal reinforces further to pressures as high as 20,000 psi without failure.

Thus, in accordance with the invention, an improved process instrument probe which is used for industrial process level measurement in high temperature and high pressure environments employs a substantially improved high temperature and pressure seal.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A probe for use with a measurement instrument including a circuit connected to the probe, the probe comprising:
   a process adapter for mounting to a process vessel and including a through bore extending from a connector end to a process end;
   a tubular body received in the process adapter at the connector end, the body having an outer wall and an inner wall and being solid therebetween, the outer wall having an outer diameter less than an inner diameter of the process adapter at the connector end to define a cavity bounded by the tubular body outer wall and the process adapter, the cavity being open to the process vessel;
   a coupling securing the body to the process adapter;
   a center conductor coaxial with the tubular body and the process adapter; and
   a seal element surrounding the center conductor and encased in the tubular body to provide a seal therebetween;
   wherein process pressure in the process vessel increases compressive force between the tubular body and the seal element.

2. The probe of claim 1 wherein the probe has an electrical terminal connected to the center conductor.

3. The probe of claim 1 wherein the tubular body comprises a metal body.

4. The probe of claim 3 wherein the metal body comprises a flange welded to the coupling.

5. The probe of claim 1 wherein the seal element comprises a glass or ceramic seal.

6. The probe of claim 5 wherein the tubular body includes a first counterbore at a process end defining a first shoulder supporting the glass or ceramic seal.

7. The probe of claim 6 wherein the tubular body comprises a second counterbore at a connector end receiving a dielectric insert housed in the coupling.

8. A probe defining a transmission line for use with a measurement instrument including a pulse circuit connected to the probe for generating pulses on the transmission line and receiving reflected pulses on the transmission line, the probe comprising:
a process adapter for mounting to a process vessel and including a through bore extending from a connector end to a process end;
a tubular metal body received in the process adapter at the connector end and having an outer diameter less than an inner diameter of the process adapter at the connector end to define a cavity therebetween, the cavity being open to the process vessel, and having an enlarged counterbore facing the process vessel to define a shoulder;
a coupling securing the tubular metal body to the process adapter;
a center conductor coaxial with the tubular metal body and the process adapter; and
a glass or ceramic seal element surrounding the center conductor and encased in the tubular metal body and engaging the shoulder to provide a seal between the center conductor and the tubular metal body;
wherein process pressure in the process vessel increases compressive force between the tubular body and the seal element.

9. The probe of claim 8 wherein the probe has an electrical terminal connected to the center conductor.

10. The probe of claim 8 wherein the coupling comprises an extension tube housing a dielectric insert.

11. The probe of claim 8 wherein the tubular metal body comprises a flange welded to the coupling.

12. The probe of claim 8 wherein the tubular metal body comprises a counterbore at a connector end receiving a dielectric insert housed in the coupling.

13. The probe of claim 8 wherein the process adapter comprises a first counterbore at the connector end receiving the tubular metal body and a second counterbore at the connector end, and of a larger diameter than the first counterbore, receiving the coupling.

14. The probe of claim 13 wherein the tubular metal body comprises a flange having a diameter greater than the diameter of the first counterbore and received in the second counterbore to be welded to the process adapter and the coupling.

15. The probe of claim 8 wherein the center conductor comprises a pin conductor extending through the seal element and connected to a probe rod extending into the process vessel.

16. A probe for use with a measurement instrument including a circuit connected to the probe, the probe comprising:
a process adapter for mounting to a process vessel and including a through bore extending from a connector end to a process end;
a tubular metal body received in the process adapter at the connector end, the tubular metal body having an outer wall and an inner wall and being solid therebetween, the outer wall having an outer diameter less than an inner diameter of the process adapter at the connector end to define a cavity bounded by the tubular metal body outer wall and the process adapter, the cavity being open to the process vessel;
a coupling securing the body to the process adapter;
a center conductor coaxial with the tubular body and the process adapter; and
a seal element surrounding the center conductor and encased in the tubular body providing a hermetical seal therebetween;
wherein process pressure in the process vessel increases compressive force between the tubular body and the seal element.

17. The probe of claim 16 wherein the metal body comprises a flange welded to the coupling.

18. The probe of claim 16 wherein the metal body includes a first counterbore at a process end defining a first shoulder supporting the seal element.

19. The probe of claim 18 wherein the metal body comprises a second counterbore at a connector end receiving a dielectric insert housed in the coupling.

* * * * *